(12) United States Patent
Zhang et al.

(10) Patent No.: US 10,303,659 B2
(45) Date of Patent: May 28, 2019

(54) STORING ENCODED DATA FILES ON MULTIPLE FILE SERVERS

(75) Inventors: Lei Zhang, Beijing (CN); Xuefeng Song, Shijiazhuang (CN)

(73) Assignee: Empire Technology Development LLC, Wilmington, DE (US)

( * ) Notice: Subject to any disclaimer, the term of this patent is extended or adjusted under 35 U.S.C. 154(b) by 269 days.

(21) Appl. No.: 14/004,850

(22) PCT Filed: Aug. 16, 2012

(86) PCT No.: PCT/CN2012/080229
§ 371 (c)(1),
(2), (4) Date: Sep. 12, 2013

(87) PCT Pub. No.: WO2014/026355
PCT Pub. Date: Feb. 20, 2014

(65) Prior Publication Data
US 2014/0195574 A1 Jul. 10, 2014

(51) Int. Cl.
| | | |
|---|---|---|
| *G06F 11/10* | (2006.01) |
| *G06F 16/18* | (2019.01) |
| *G06F 16/182* | (2019.01) |
| *G06F 17/30* | (2006.01) |
| *G06F 11/14* | (2006.01) |
| *G06F 11/20* | (2006.01) |

(52) U.S. Cl.
CPC ........ *G06F 16/182* (2019.01); *G06F 11/1076* (2013.01); *G06F 11/1479* (2013.01); *G06F 11/2094* (2013.01); *G06F 17/30194* (2013.01)

(58) Field of Classification Search
CPC .. G06F 17/30067; G06F 3/0605; G06F 3/067; G06F 3/0631; G06F 3/0647

USPC ......................................................... 707/827
See application file for complete search history.

(56) References Cited

U.S. PATENT DOCUMENTS 6,138,125 A * 10/2000 DeMoss .............. G06F 11/1076
707/999.202
7,509,322 B2 * 3/2009 Miloushev et al.
(Continued)

FOREIGN PATENT DOCUMENTS

| CN | 101064596 A | 10/2007 |
| CN | 101976174 A | 2/2011 |

OTHER PUBLICATIONS

Gwang S. Jung et al., "An Automatically Reconfigurable Distributed Data Storage System for High Data Availability" Proceedings of the IASTEDInternational Conference Parallel and Distributed Computing Systems Nov. 3-6, 1999, Boston, MA, USA.
(Continued)

*Primary Examiner* — Pierre M Vital
*Assistant Examiner* — Andrew N Ho

(57) ABSTRACT

In some examples, a method for encoding and storing data blocks of a data file on multiple file servers is described. The method may include selecting a data clip size S, selecting a number N of data clips to include in each data block, and dividing the data file into data blocks each having data size (S×N). The method may also include, for each data block, dividing the data block into N data clips, generating a random number R where $1 \leq R \leq N$, selecting a number K of redundant data clips where $N \leq K < 2^{\wedge}N$, encoding K data clips using random linear coding by XORing R data clips K times, and storing the K encoded data clips on the multiple file servers.

19 Claims, 4 Drawing Sheets

(56) References Cited

U.S. PATENT DOCUMENTS

| | | | |
|---|---|---|---|
| 7,685,126 B2* | 3/2010 | Patel et al. | 707/770 |
| 7,962,779 B2* | 6/2011 | Patel et al. | 714/4.12 |
| 2002/0162047 A1* | 10/2002 | Peters et al. | 714/5 |
| 2003/0196023 A1* | 10/2003 | Dickson | G06F 11/1076 711/1 |
| 2004/0088380 A1* | 5/2004 | Chung et al. | 709/219 |
| 2005/0240725 A1* | 10/2005 | Robinson | G06F 3/0613 711/114 |
| 2006/0218470 A1* | 9/2006 | Dickson | G06F 11/1076 714/767 |
| 2006/0248378 A1* | 11/2006 | Grcanac et al. | 714/6 |
| 2007/0050543 A1* | 3/2007 | Pomerantz | G06F 3/0605 711/114 |
| 2007/0208790 A1* | 9/2007 | Reuter et al. | 707/206 |
| 2007/0245083 A1* | 10/2007 | Margolus et al. | 711/114 |
| 2007/0253548 A1* | 11/2007 | Kameyama | G06F 21/6218 380/28 |
| 2008/0270729 A1* | 10/2008 | Reddy et al. | 711/170 |
| 2010/0064166 A1* | 3/2010 | Dubnicki et al. | 714/4 |
| 2010/0169391 A1* | 7/2010 | Baptist et al. | 707/827 |
| 2011/0153606 A1* | 6/2011 | Kim | G06F 17/302 707/737 |
| 2011/0313973 A1* | 12/2011 | Srivas et al. | 707/634 |

OTHER PUBLICATIONS

Viveck R. Cadambe et al., "Distributed Data Storage with Minimum Storage Regenerating Codes—Exact and Functional Repair are Asymptotically Equally Efficient" Electircal Engineering and Computer Science University of California Irvine, Apr. 2010.

Benjamin Gaidioz et al., "Exploring High Performance Dstributed File Storage Using LDPC Codes" CERN, Geneva, Switzerland, Jan. 2007.

CN Office Action dated Nov. 30, 2016 as received in Application No. 201280075352.2.

\* cited by examiner

STORING ENCODED DATA FILES ON MULTIPLE FILE SERVERS

CROSS-REFERENCE TO RELATED APPLICATION

This application is a U.S. National Stage filing under 35 U.S.C. § 371 of International Application No. PCT/CN2012/080229, entitled "STORING ENCODED DATA FILES ON MULTIPLE FILE SERVERS", filed on Aug. 16, 2012.

BACKGROUND

Unless otherwise indicated herein, the materials described herein are not prior art to the claims in the present application and are not admitted to be prior art by inclusion in this section.

The number of computer systems and users connected to the Internet has been growing rapidly. In a very large distributed computing environment such as the Internet, the likelihood of file server failure increases with the number of file servers. Failure may occur due to software and hardware malfunctioning, excessive file server load, network congestion, and/or natural disasters. Such failures may lead to data unavailability and therefore less dependable service to users.

Current distributed file storage systems, such as the Coda file system, the Andrew file System, and the Echo file system, store data objects across multiple file servers. The Coda file system, which inherits largely from the Andrew file system, was developed to focus on availability issues. Coda does not reconfigure the file system to provide data availability. Instead it keeps read-only replicas of files at remote sites in case of a file server failure and disconnected operation. The Echo file system has various ways of detecting faults, such as file server failure, automatically and can report these by a daemon process that sends messages to administrators responsible for dealing with faults. However, reconfiguration is done manually. In general, availability of data is provided by keeping the file at a primary site for download, and its replicas at other sites in case of primary site failure. The Echo system relies heavily on redundant copies of everything in case of failure. A secondary site monitors a primary site availability and vice versa.

Each of these approaches for enabling high data availability and dependable service in a distributed environment tends to increase the complexity of file server management, increase the degree of calculation complexity, or provide insufficient redundancy.

SUMMARY

Technologies described herein generally relate to encoding and storing data files on multiple file servers and retrieving and decoding the data files from the multiple file servers.

In some examples, a method for encoding and storing data blocks of a data file on multiple file servers is described. The method may include selecting a data clip size S, selecting a number N of data clips to include in each data block, and dividing the data file into data blocks each having data size (S×N). The method may also include, for each data block, dividing the data block into N data clips, generating a random number R where $1 \leq R \leq N$, selecting a number K of redundant data clips where $N \leq K < 2^N$, encoding K data clips using random linear coding by XORing R data clips K times, and storing the K encoded data clips on the multiple file servers.

In some examples, a method for retrieving and decoding encoded data blocks of a data file from multiple file servers is described. The method may include retrieving a data clip size S and a number N of data clips included in each data block. The method may also include, for each encoded data block, retrieving N linearly independent encoded data clips corresponding to the data block from the multiple file servers, decoding the N linearly independent encoded data clips using one or more linear equations, and assembling the N data clips each having the data clip size S into the data block. The method may also include assembling the data blocks into the data file.

In some examples, a system for storing encoded data blocks of a data file on multiple file servers and retrieving encoded data blocks of the data file from the multiple file servers is described. The system may include a primary file server and one or more secondary file servers. The primary file server may be configured, during the storing of the data file, to select a data clip size S, select a number N of data clips to include in each data block, divide the data file into data blocks each having data size (S×N), and, for each data block, divide the data block into N data clips, generate a random number R where $1 \leq R \leq N$, select a number K of redundant data clips where $N \leq K < 2^N$, encode K data clips using random linear coding by XORing R data clips K times, and store the K encoded data clips on one or more secondary file servers. The primary file server may be further configured, during the retrieving of the data file and for each encoded data block, to retrieve N linearly independent encoded data clips corresponding to the data block from the one or more secondary file servers, decode the N linearly independent encoded data clips using one or more linear equations, and assemble the N data clips each having the data clip size S into the data block. The primary file server may be further configured, during the retrieving of the data file, to assemble the data blocks into the data file.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
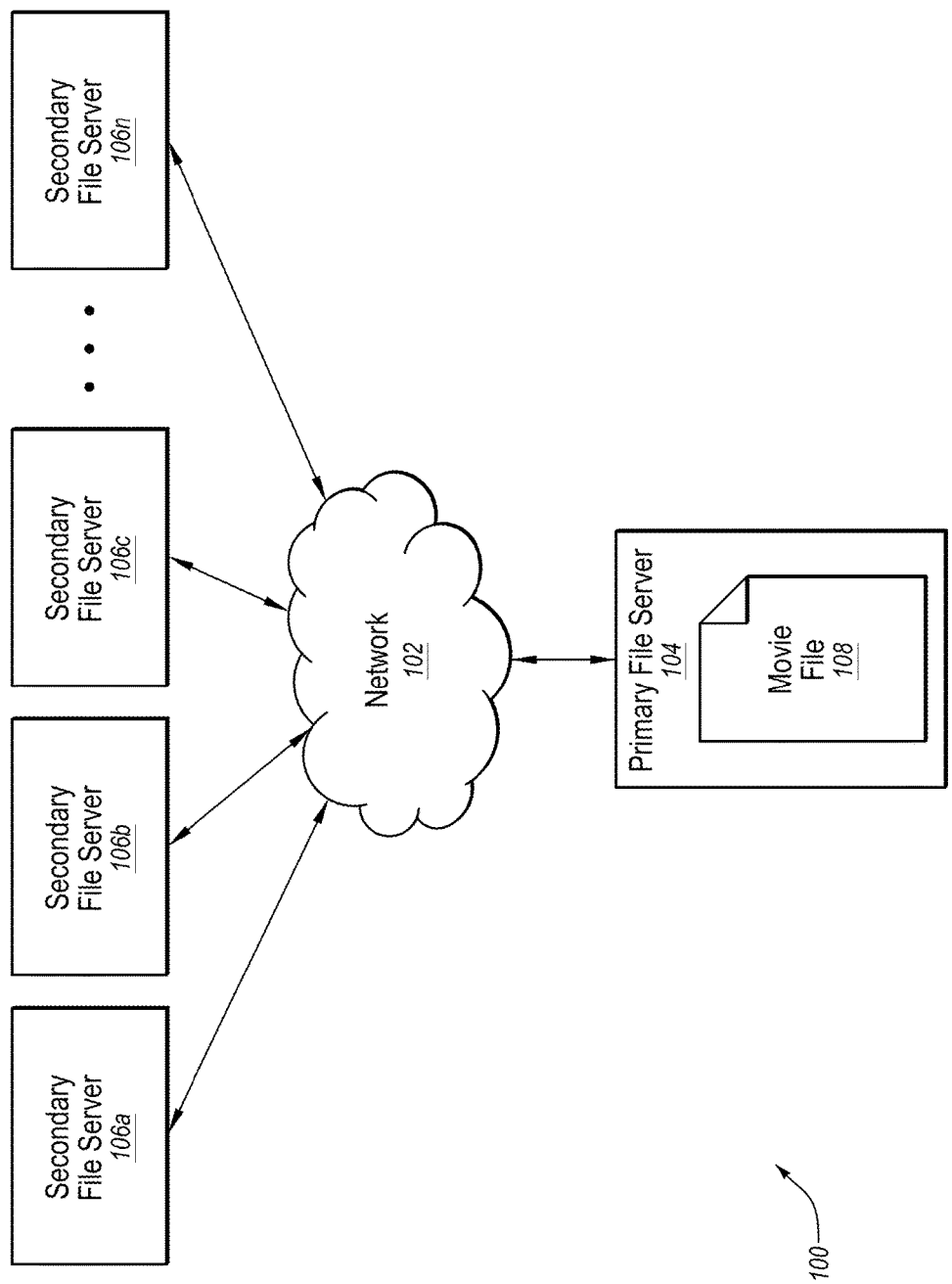
FIG. 1 is a block diagram of an example distributed file storage system including multiple file servers in which embodiments of encoding and storing a data file on multiple file servers and retrieving and decoding the data file from the multiple file servers may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein generally relate to encoding and storing data files on multiple file servers and retrieving and decoding the data files from the multiple file servers. Storing the encoded data files on multiple file servers can maintain data integrity and availability by storing redundant data. The data files may be encoded using random linear encoding, which tends to decrease the complexity of fileserver management, decrease the degree of calculation complexity, and provide sufficient redundancy. Accordingly, in some embodiments described herein, a relatively large data file, such as a high-definition movie file, can be encoded and stored in a distributed fashion across multiple file servers and later retrieved from the multiple file servers and decoded with a relatively low complexity of fileserver management, a relatively low degree of calculation complexity, and sufficient redundancy to generally avoid data loss due to file server failures. Thus, when a data file is encoded and stored according to embodiments described herein, the storage of redundant data is achieved or the distribution of a data file among multiple file servers is achieved, or both.

FIG. 1 is a block diagram of an example distributed file storage system 100 including multiple file servers in which embodiments of encoding and storing a data file on multiple file servers and retrieving and decoding the data file from the multiple file servers may be implemented, arranged in accordance with at least some embodiments described herein. In the illustrated embodiment, the example distributed file storage system 100 may include a network 102, a primary file server 104, and one or more secondary file servers 106a-106n.

In general, the network 102 may include one or more wide area networks (WANs) and/or local area networks (LANs) that enable the primary file server 104 and the secondary file servers 106a-106n to communicate with each other. In some embodiments, the network 102 may include or be constituted by the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

The primary file server 104 may execute an application (not shown) configured to communicate through the network 102 with the secondary file servers 106a-106n. The application executed on the primary file server 104 to communicate with the secondary file servers 106a-106n may include a distributed file system application, or other suitable application. Each of the secondary file servers 106a-106n may execute an application (not shown) that is similar or identical to the application executed by the primary file server 104. For example, the primary file server 104 may be configured as a NameNode of a Hadoop Distributed File System (HDFS) and the one or more secondary file servers 106a-106n may be each configured as a DataNode of the HDFS. Each of the primary file server 104 and the secondary file servers 106a-106n may be, but is not limited to, a web server, file server, a desktop computer, a laptop computer, a mobile phone, a smartphone, a personal digital assistant (PDA), or other suitable file server device.

By way of example, and not limitation, the primary file server 104 and each of the secondary file servers 106a-106n may include processing resources such as one or more central processing units (CPUs), storage resources such as one or more storage devices, other resources such as network interface controllers (NICs) or other communication interface devices, and/or other suitable computer resources.

Figure 2:
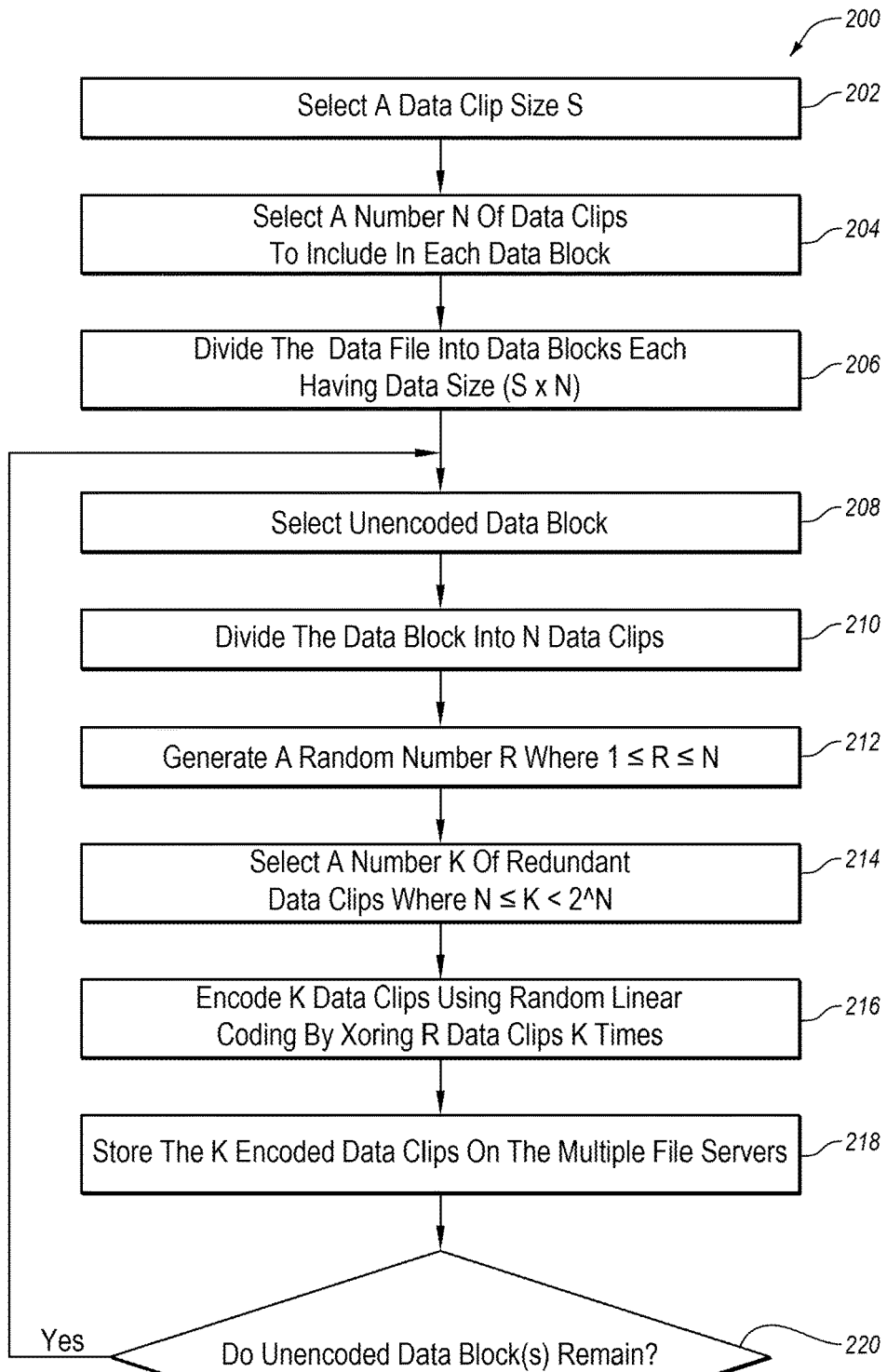
FIG. 2 shows an example flow diagram of a method for encoding and storing a data file on multiple file servers.
Figure 3:
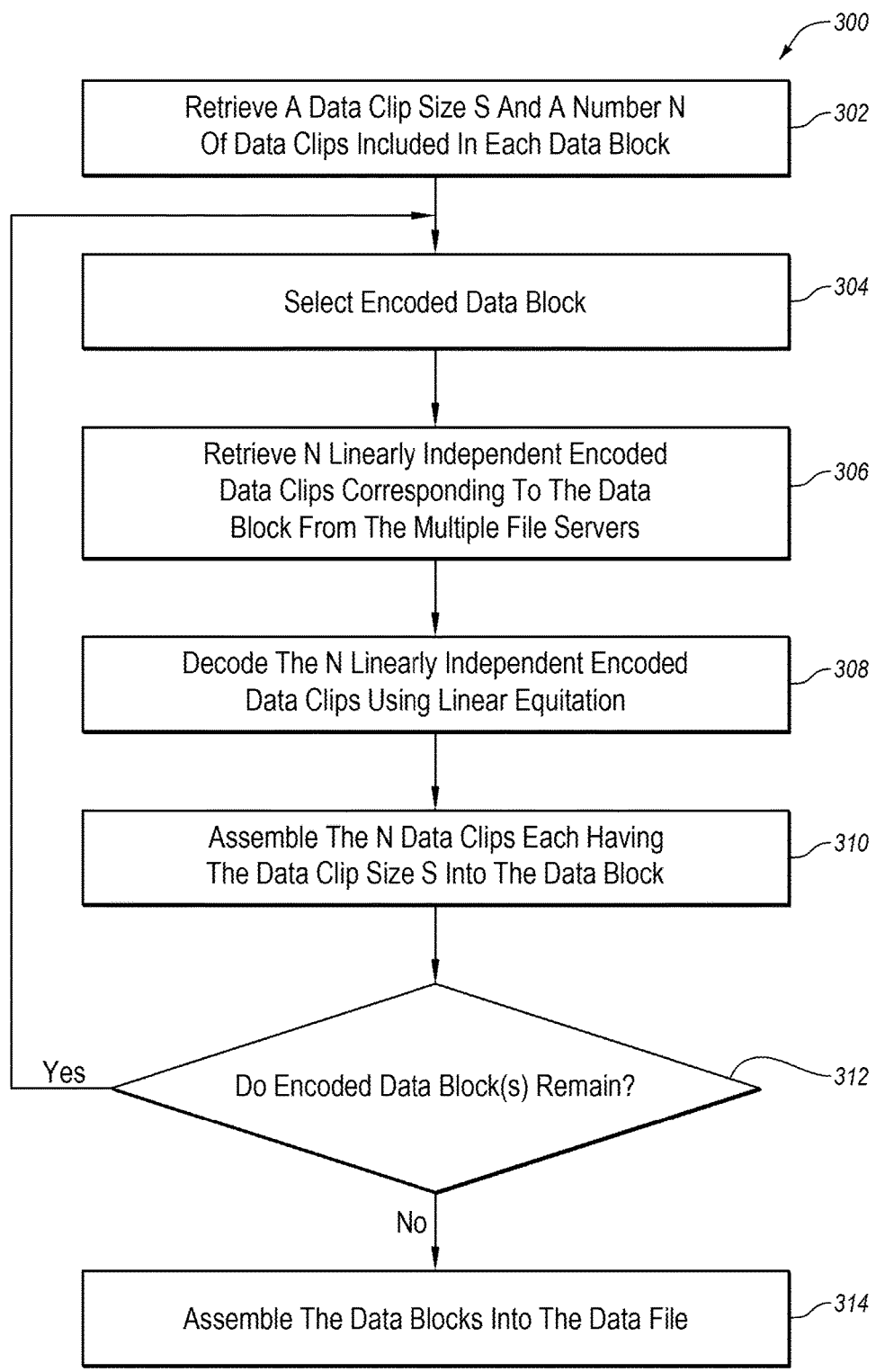
FIG. 3 shows an example flow diagram of a method for retrieving and decoding an encoded data file from multiple file servers.

In some embodiments, the primary file server 104 and each of the secondary file servers 106a-106n may implement methods for encoding and storing data files on multiple file servers, such as the method 200 described herein in reference to FIG. 2, and retrieving and decoding the data files from the multiple file servers, such as the method 300 described herein in reference to FIG. 3. For example, a high-definition movie file 108 that is stored on the primary file server 104, or otherwise accessible to the primary file server 104, may be encoded and divided to be stored across the secondary file servers 106a-106n using the method 200 of FIG. 2. Similarly, the encoded divisions of the high-definition movie file 108 that are stored across the secondary file servers 106a-106n may be retrieved, decoded, and reassembled into the high-definition movie file 108 using the method 300 of FIG. 3. It is noted that the high-definition movie file 108 is but one example of a data file that can be encoded and decoded using the methods discussed herein, and data files having other types of content can similarly be encoded and decoded using the methods discussed herein.

FIG. 2 shows an example flow diagram of a method 200 for encoding and storing a data file on multiple file servers, arranged in accordance with at least some embodiments described herein. The method 200 may be performed on a data file in whole or in part by, e.g., the primary file server 104 of FIG. 1 using the secondary file servers 106a-106n of FIG. 1. For purposes of illustration only, the data file discussed in the examples below will be the high-definition movie file 108, which is designated as having a size of 4 GB. The method 200 includes various operations, functions or actions as illustrated by one or more of blocks 202-220. The method 200 begins at block 202.

In block 202 ("Selecting A Data Clip Size S"), a data clip size S is selected for the encoding of the data file. For example, the primary file server 104 may select a data clip size S that matches a system page size of the primary file server 104. Selecting a data clip size S that matches a system page size can improve performance by reading a full page of data for each clip, thus reducing addressing and operating system kernel mode and user mode switching times. Where the primary file server 104 is running a Linux operating system with a page size set to 4 kB, the data clip size S may be selected as 4 kB to match the Linux operating system page size. Similarly, where the primary file server 104 is running another Linux operating system that is set to have a page size of 16 kB, the data clip size S may be selected as 16 kB to match the other Linux operating system page size. In other example embodiments, the data clip size S may be selected as a size other than a system page size of the primary file server 104. Block 202 may be followed by block 204.

In block 204 ("Select A Number N Of Data Clips To Include In Each Data Block"), a number N of data clips to include in each data block of the encoded data file is selected. For example, the primary file server 104 may select a number N as a random prime number. In some example embodiments, the number N may be selected as a random prime number such as 9973, for example. Alternatively, the number N may be selected as a random non-prime number. Block 204 may be followed by block 206.

In block 206 ("Dividing The Data File Into Data Blocks Each Having Data Size (S×N)"), the data file is divided into data blocks each having data size (S×N). For example, where the primary file server 104 has selected the data clip size as 4 kB, and the number N of data clips as 9973, the primary file server 104 may divide the high-definition movie file 108 of size (4 GB=4,194,304 kB) into data blocks each having a size of (4 kB×9973=39,892 kB). Block 206 may be followed by block 208.

Where the data size (S×N) does not divide into the size of the data file evenly, a final data block may be padded with zeros. For example, the primary file server 104 may divide the high-definition movie file 108 into 106 data blocks each of size 39,892 kB, with the final data block of the high-definition movie file 108 having 5644 kB of actual data and 34,248 kB of padded zeros.

In block 208 ("Select Unencoded Data Block"), one of the unencoded data blocks is selected. For example, the primary file server 104 may select one of the unencoded data blocks of size 39,892 kB of the high-definition movie file 108 for encoding. Block 208 may be followed by block 210.

In block 210 ("Divide The Data Block Into N Data Clips"), the selected data block is divided into N data clips. For example, where the primary file server 104 has selected the number N of data clips as 9973, the primary file server 104 may divide the selected data block into 9973 data clips. Block 210 may be followed by block 212.

In block 212 ("Generate A Random Number R Where $1 \leq R \leq N$"), a random number R is generated where $1 \leq R \leq N$. For example, where the primary file server 104 has selected the number N of data clips as 9973, the primary file server 104 may generate a random number greater than 1 and less than 9973. Block 212 may be followed by block 214.

In block 214 ("Select A Number K Of Redundant Data Clips Where $N \leq K < 2^N$"), a number K of redundant data clips is selected where $N \leq K < 2^N$. For example, where the primary file server 104 has selected the number N of data clips as 9973, the primary file server 104 may select a number K of redundant data clips that is greater than or equal to 9973 and less than $2^{9973}$, where $2^{9973}$ denotes 2 to the 9973rd power. Block 214 may be followed by block 216.

In block 216 ("Encode K Data Clips Using Random Linear Coding By XORing R Data Clips K Times"), K data clips are encoded using random linear coding by XORing R data clips K times. For example, where the primary file server 104 has selected R as 3 and K as 18,357, the primary file server 104 may encode 18,357 data clips using random linear coding by XORing 3 data clip 18,357 times. Block 216 may be followed by block 218.

In block 218 ("Store The K Encoded Data Clips On The Multiple File Servers"), the K encoded data clips are stored on the multiple file servers. For example, where the primary file server 104 has selected K as 18,357, the primary file server 104 may encode 18,357 data clips on the multiple secondary file servers 106a-106n. Block 218 may be followed by decision block 220.

In decision block 220 ("Do Unencoded Data Block(s) Remain?"), it is determined whether unencoded data blocks remain. For example, where the high-definition movie file 108 has been divided into 106 data blocks as in the example above, the primary file server 104 determines if any of the 106 data blocks remain unencoded and not yet stored on the multiple secondary file servers 106a-106n. If so ("YES" at block 220), the primary file server 104 may return to the block 208 in order to encode and store the remaining blocks. Otherwise, the method 200 terminates because all of the data blocks of the high-definition movie file 108 have been encoded and stored on the multiple secondary file servers 106a-106n.

Accordingly, the method 200 of FIG. 2 may be employed to encode and store a data file across multiple file servers. Subsequent to the performance of the method 200 on a data file, such as the high-definition movie file 108 as discussed above, the same data file may be retrieved and decoded using the method 300 of FIG. 3.

FIG. 3 shows an example flow diagram of a method 300 for retrieving and decoding an encoded data file from multiple file servers, arranged in accordance with at least some embodiments described herein. The method 300 may be performed on a data file in whole or in part by, e.g., the primary file server 104 of FIG. 1 using the secondary file servers 106a-106n of FIG. 1. For purposes of illustration only, the data file discussed in the examples below will be the high-definition movie file 108 of size 4 GB that has previously been encoded and stored on the secondary file servers 106a-106n using the example performance of the method discussed above in connection with the discussion of FIG. 2. The method 300 includes various operations, functions or actions as illustrated by one or more of blocks 302-314. The method 300 begins at block 302.

In block 302 ("Retrieve A Data Clip Size S And A Number N Of Data Clips Included In Each Data Block"), a data clip size S and a number N of data clips included in each data block are retrieved. For example, the primary file server 104 may retrieve the previously selected data clip size of 4 kB and the previously selected number 9973 of data clips included in each data block for the for the previously encoded high-definition movie file 108. Block 302 may be followed by block 304.

In block 304 ("Select Encoded Data Block"), one of the encoded data blocks is selected. For example, the primary file server 104 may select one of the previously encoded data blocks of size 39,892 kB of the high-definition movie file 108. Block 304 may be followed by block 306.

In block 306 ("Retrieve N Linearly Independent Encoded Data Clips Corresponding To The Data Block From The Multiple File Servers"), N linearly independent encoded data clips corresponding to the selected data block are retrieved from the multiple file servers. For example, the primary file server 104 may retrieve 9973 linearly independent encoded data clips corresponding to the selected data block from the secondary file servers 106a-106n. Block 306 may be followed by block 308.

In block 308 ("Decode The N Linearly Independent Encoded Data Clips Using One or More Linear Equations"), the N linearly independent encoded data clips are decoded using one or more linear equations. For example, the primary file server 104 may decode the 9973 linearly independent encoded data clips that have been retrieved, which correspond to the selected data block, using one or more linear equations by XORing at least some of the 9973 linearly independent encoded data clips in 9973 linear equations to arrive at the original 9973 data clips of size 4 kB of the selected data block. In at least some example embodiments, this decoding may be accomplished using one of a variety of known sparse Gaussian elimination methods. Block 308 may be followed by block 310.

In block 310 ("Assemble The N Data Clips Each Having The Data Clip Size S Into The Data Block"), the N data clips each having the data clip size S are assembled into the data block. For example, the primary file server 104 may assemble the 9973 decoded data clips, each of which have a data clip size of 4 kB, into the selected data block. Block 310 may be followed by block 312.

In decision block 312 ("Do Encoded Data Block(s) Remain?"), it is determined whether encoded data blocks remain. For example, where the high-definition movie file 108 has been divided into 106 data blocks as in the example above, the primary file server 104 may determine if any of the 106 data blocks remain encoded and stored on the secondary file servers 106a-106n. If so ("YES" at block 312), the primary file server 104 may return to the block 304 to decode the remaining blocks. If not ("NO" at block 312), the primary file server 104 may continue to 314 ("Assemble The Data Blocks Into The Data File") where the data blocks are assembled into the data file. For example, the primary file server 104 may assemble each of the 106 decoded data blocks into the decoded high-definition movie file 108. The method 300 then terminates because the high-definition movie file 108 has been decoded and reassembled.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, each of the methods 200 and 300 may be performed repeatedly in order to encode and decode multiple data files.

Some embodiments disclosed herein include a computer storage medium having computer-executable instructions stored thereon that are executable by a computing device to perform operations included in the methods 200 and 300 of FIGS. 2 and 3, such as the operations illustrated by any of the blocks 202-220 and 302-314 and/or variations thereof. The computer storage medium may be included in one or more storage devices of the primary file server 104 and the secondary file servers 106a-106n of FIG. 1.

Accordingly, some embodiments of encoding and storing data files on multiple file servers described herein may maintain data integrity and availability by storing redundant data. The encoding of the data files using random linear encoding tends to decrease the complexity of fileserver management, decrease the degree of calculation complexity, and provide sufficient redundancy. Therefore, in some embodiments described herein, a relatively large data file, such as the high-definition movie file 108 with a size of 4 GB, can be encoded and stored in a distributed fashion across multiple file servers and later retrieved from the multiple file servers and decoded with a relatively low complexity of fileserver management, a relatively low degree of calculation complexity, and sufficient redundancy to generally avoid data loss due to file server failures.

Figure 4:
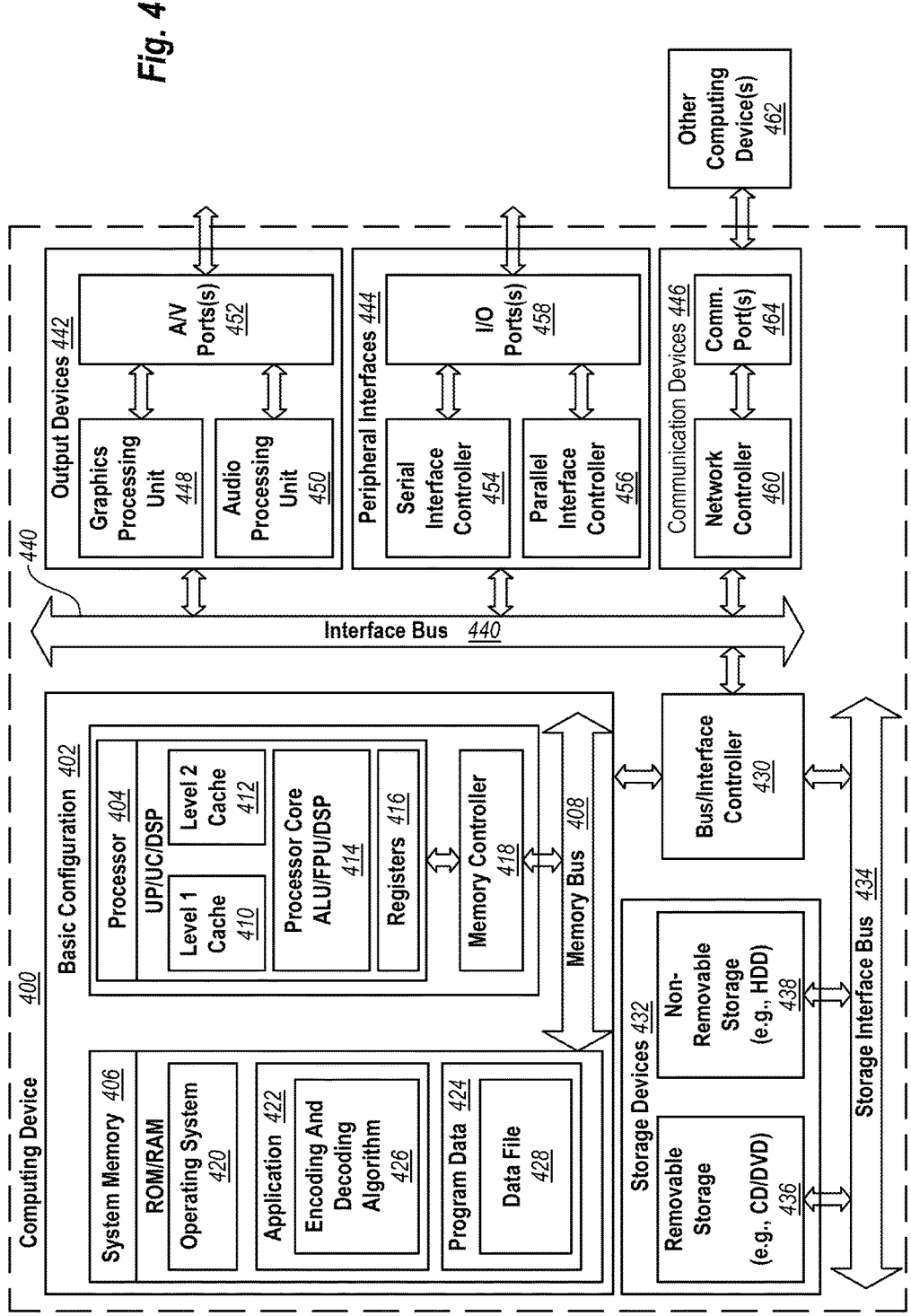
FIG. 4 is a block diagram illustrating an example computing device that is arranged for encoding and storing a data file on multiple file servers and retrieving and decoding the encoded data file from the multiple file servers, all arranged in accordance with at least some embodiments described herein.

FIG. 4 is a block diagram illustrating an example computing device 400 that is arranged for encoding and storing a data file on multiple file servers and retrieving and decoding the encoded data file from the multiple file servers, arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an encoding and decoding algorithm 426 that is arranged to perform the functions as described herein including those described with respect to the methods 200 and 300 of FIGS. 2 and 3. Program data 424 may include a data file 428 that may be useful for being encoded or decoded as described herein. In some embodiments, application 422 may be arranged to operate with program data 424 on operating system 420 such that implementations of encoding and storing methods such as the method 200 of FIG. 2 and retrieving and decoding methods such as the method 300 of FIG. 3 may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term "computer readable media" as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to encode and store data blocks of a data file on multiple file servers of a distributed file storage system, wherein the multiple file servers include a primary file server and one or more secondary file servers, the method comprising:
   dividing the data file into the data blocks, and further dividing the data blocks into data clips, wherein dividing the data file into the data blocks and further dividing the data blocks into data clips comprises:
      selecting a data clip size "S" based on a system page size of the primary file server of the multiple file servers, wherein the data clip size S indicates an amount of data included in a data clip, wherein the system page size indicates an amount of data included in a system page of the primary file server of the multiple file servers, wherein the selected data clip size S is same as the system page size of the primary file server of the multiple file servers, and wherein the data clip size S being the same as the system page size facilitates reading of a full system page for each data clip, which facilitates reduction in switching times between a user mode and a kernel mode, of an operating system of the primary file server, and facilitates improvement in performance of the distributed file storage system;
      selecting a number "N" of data clips to include in each data block;
      dividing the data file into the data blocks each having data size (S×N); and
      dividing each of the data blocks into N data clips;
   generating a random number "R" based on N in which $1 \leq R \leq N$;
   selecting a number "K" of redundant data clips based on N in which $N \leq K \leq 2^N$;
   encoding the K selected data clips using random linear coding by XORing R data clips K times, wherein encoding the K selected data clips using the random linear coding by XORing the R data clips K times reduces calculation complexity to store the data file, and thereby reduces complexity of fileserver management of the distributed file storage system; and
   storing the K encoded data clips on the one or more secondary files servers of the multiple file servers in a distributed manner, wherein the storage of the K encoded data clips on the one or more secondary file servers facilitates retrieval of the data file from the multiple file servers, and wherein availability of the K encoded data clips on the one or more secondary file servers reduces data loss due to failure of the primary file server.

2. The method of claim 1, wherein the system page size is 4 kB.

3. The method of claim 1, wherein the system page size is 16 kB.

4. The method of claim 1, wherein selecting the number N comprises selecting a random number.

5. The method of claim 1, wherein selecting the number N comprises selecting a prime number.

6. The method of claim 1, wherein the number N of data clips is selected as 9973.

7. The method of claim 1, further comprising padding a final data block with zeros such that the data block size (S×N) does not evenly divide into a size of the data file.

8. The method of claim 1, wherein the multiple file servers are configured to execute a hadoop distributed file system (HDFS).

9. A non-transitory computer storage medium having computer-executable instructions stored thereon that are executable by a computation device to perform the method of claim 1.

10. A method to retrieve and decode encoded data blocks of a data file from multiple file servers of a distributed file storage system, wherein the multiple file servers include a primary file server and one or more secondary file servers, the method comprising:
    retrieving linearly independent encoded data clips, included in the encoded data blocks of the data file, which are stored on the one or more secondary file servers, wherein retrieving the linearly independent encoded data clips included in the encoded data blocks of the data file comprises:
       retrieving a data clip storage space size "S" and a number "N" of data clips included in each data block, wherein the data clip storage space size S indicates an amount of data included in a data clip, wherein the data clip storage space size S is selected to match a system page size of the primary file server of the multiple file servers, and wherein the system page size indicates an amount of data included in a system page of the primary file server of the multiple file servers, and wherein the selection of the data clip storage space size S to match the system page size facilitates reading of a full system page for each data clip, which facilitates reduction in switching times between a user mode and a kernel mode, of an operating system of the primary file server, and facilitates improvement in performance of the distributed file storage system;
       retrieving the N linearly independent encoded data clips that correspond to the encoded data block from the one or more secondary file servers of the multiple file servers, wherein the storage of N linearly independent encoded data clips on the one or more secondary file servers facilitates retrieval of the data file from the multiple file servers, and wherein availability of the encoded data blocks on the one or more secondary file servers reduces data loss due to failure of the primary file server;
    decoding the N linearly independent encoded data clips based on one or more linear equations; and assembling the N data clips each having the data clip storage space size S into the data block; and assembling the data blocks into the data file.

11. The method of claim 10, wherein the system page size is 4 kB or 16 kB.

12. The method of claim 10, wherein retrieving the number N comprises retrieving a random prime number.

13. The method of claim 10, wherein the number N of data clips is selected as 9973.

14. The method of claim 10, further comprising, prior to assembling the data blocks into the data file, removing zeros padded on a final data block if the data block size (S×N) does not evenly divide into a size of the data file.

15. The method of claim 10, wherein the multiple file servers are configured to execute a hadoop distributed file system (HDFS).

16. A non-transitory computer storage medium having computer-executable instructions stored thereon that are executable by a computation device to perform the method of claim 10.

17. A system to encode and store data blocks of a data file on multiple file servers of a distributed file storage system and to retrieve and decode the encoded data blocks of the data file from the multiple file servers, the system comprising:

a primary file server; and one or more secondary file servers, wherein the primary file server is configured, during the storage of the data file, to:

divide the data file into the data blocks and further divide the data blocks into data clips, by performance or control of performance of operations comprising:

select a data clip size "S" based on a system page size of the primary file server, wherein the data clip size S indicates an amount of data included in a data clip and the system page size indicates an amount of data included in a system page of the primary file server, wherein the selected data clip size S is same as the system page size of the primary file server, and wherein the data clip size S being the same as the system page size facilitates reading of a full system page for each data clip, which facilitates reduction in switching times between a user mode and a kernel mode, of an operating system of the primary file server, and facilitates improvement in performance of the distributed file storage system;

select a number "N" of data clips to include in each data block;

divide the data file into the data blocks each having data size (S×N); and divide each of the data blocks into N data clips;

generate a random number "R" where 1≤R≤N;

select a number "K" of redundant data clips where N≤K≤2^N;

encode the K selected data clips using random linear coding by XORing R data clips K times, wherein the encoding of the K selected data clips using the random linear coding by XORing the R data clips K times decreases calculation complexity to store the data file, and thereby decreases complexity of fileserver management of the distributed file storage system; and store the K encoded data clips on the one or more secondary file servers, wherein the storage of the K encoded data clips on the one or more secondary file servers facilitates retrieval of the data file from the multiple file servers, wherein availability of the K encoded data clips on the one or more secondary file servers reduces data loss due to failure of the primary file server, and wherein the primary file server is further configured, during the retrieving of the data file, to perform or control performance of operations comprising:

for each encoded data block, retrieve N linearly independent encoded data clips that correspond to the data block from the one or more secondary file servers, decode the N linearly independent encoded data clips using one or more linear equations, and assemble the N data clips each having the data clip size S into the data block; and assemble the data blocks into the data file.

18. The system of claim 17, wherein the primary file server is configured as a NameNode and the one or more secondary file servers are each configured as a DataNode of a hadoop distributed file system (HDFS).

19. A system to encode and store data blocks of a data file on multiple file servers of a distributed file storage system and to retrieve and decode the encoded data blocks of the data file from the multiple file servers, the system comprising:

a primary file server; and one or more secondary file servers, wherein the primary file server is configured, during the storage of the data file, to:

divide the data file into the data blocks and further divide the data blocks into data clips, by performance or control of performance of operations comprising:

select a data clip size based on a system page size of the primary file server, wherein the data clip size indicates an amount of data included in a data clip and the system page size indicates an amount of data included in a system page of the primary file server, wherein the selected data clip size is same as the system page size of the primary file server, wherein the data clip size being the same as the system page size facilitates reading of a full system page for each data clip, which facilitates reduction in switching times between a user mode and a kernel mode, of an operating system of the primary file server, and facilitates improvement in performance of the distributed file storage system;

select a number of data clips to include in each data block;

divide the data file into the data blocks; and divide each of the data blocks into the number of data clips;

generate a first number that is random;

select a second number of redundant data clips;

encode the selected second number of data clips using random linear coding by XOR of data clips of the first number by a number of times represented by the second number, wherein the encoding of the selected second number of data clips using the random linear coding by XORing of the data clips of the first number by the number of times represented by the second number reduces calculation complexity to store the data file, and thereby reduces complexity of fileserver management of the distributed file storage system; and store the encoded data clips on the one or more secondary file servers, wherein the storage of the encoded data clips on the one or more secondary file servers facilitates retrieval of the data file from the multiple file servers, and wherein availability of the encoded data clips on the one or more secondary file servers reduces data loss due to failure of the primary file server, and wherein the primary file server is further configured, during the retrieving of the data file, to perform or control performance of operations comprising:

for each encoded data block, retrieve linearly independent encoded data clips that correspond to the data block from the one or more secondary file servers, decode the linearly independent encoded data clips using one or more linear equations, and assemble the decoded data clips each having the data clip size into the data block; and assemble the data blocks into the data file.

\* \* \* \* \*